United States Patent [19]

Lemonde et al.

[11] 4,164,152
[45] Aug. 14, 1979

[54] BIAXIAL VIBRATION-TESTING INSTALLATION

[75] Inventors: Robert Lemonde, Paris; Bernard Dussetour, Maurepas, both of France

[73] Assignee: Societe pour le Perfectionnement des Materiels et Equipements Aerospatiaux S.O.P.M.E.A., Velizy-Villacoublay, France

[21] Appl. No.: 862,758

[22] Filed: Dec. 20, 1977

[30] Foreign Application Priority Data

Jan. 6, 1977 [FR] France ............................ 77 00212

[51] Int. Cl.² ............................................ G01M 7/00
[52] U.S. Cl. .................................................... 73/665
[58] Field of Search .............. 73/662, 663, 665, 666, 73/667, 668, 669, 672

[56] References Cited

FOREIGN PATENT DOCUMENTS

| | | | |
|---|---|---|---|
| 727247 | 10/1942 | Fed. Rep. of Germany | 73/71.6 |
| 992803 | 7/1951 | France | 73/71.6 |
| 787515 | 12/1957 | United Kingdom | 73/71.6 |
| 260935 | 10/1970 | U.S.S.R. | 73/71.6 |

Primary Examiner—Charles A. Ruehl
Attorney, Agent, or Firm—Haseltine, Lake & Waters

[57] ABSTRACT

The installation comprises means for subjecting a specimen-holder table to vibrations with respect to a massive support structure in two perpendicular directions, and guiding means which are independent of the vibration means. The guiding means are located between on the one hand the table and at least one connecting member and on the other hand the connecting member and the massive support structure. The connecting member is in mechanical relationship with the table and the massive structure solely by virtue of the guiding means.

3 Claims, 4 Drawing Figures

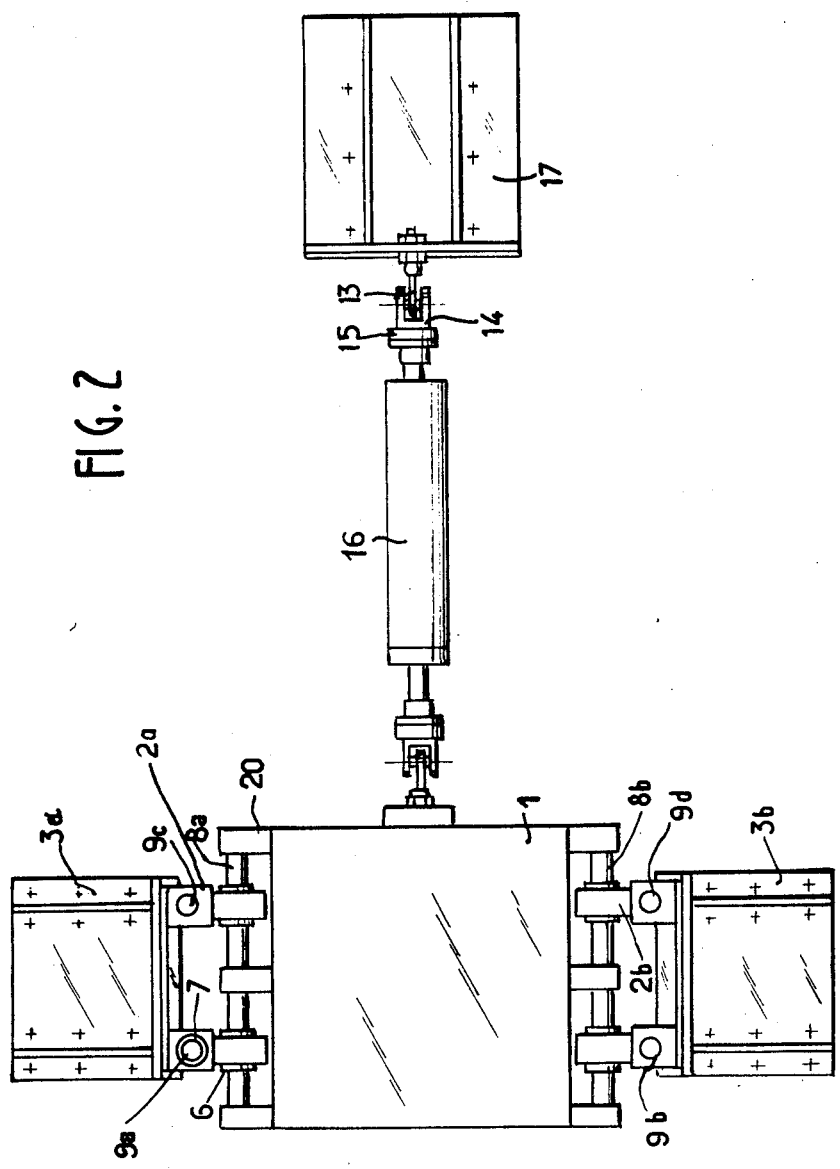

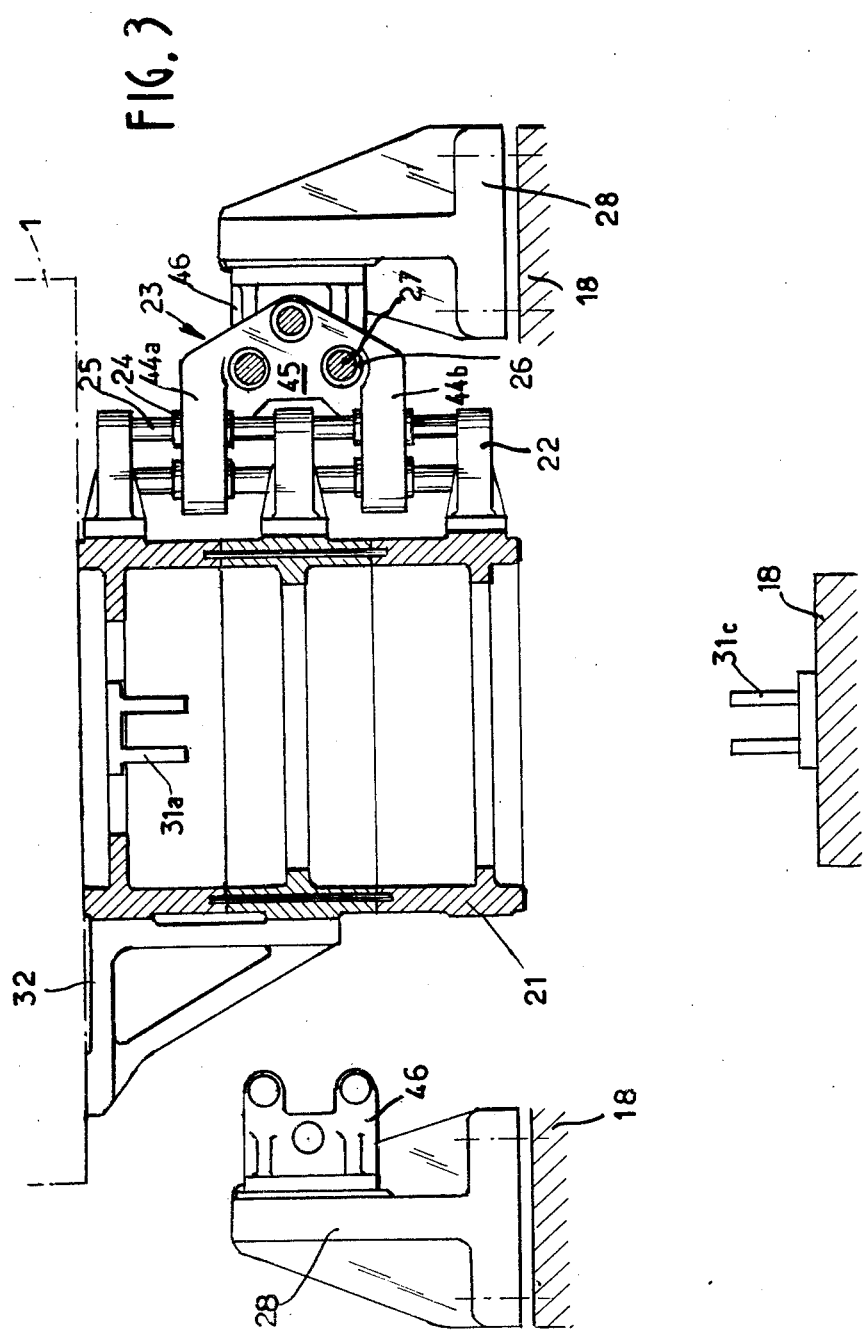

BIAXIAL VIBRATION-TESTING INSTALLATION

This invention relates to seismic tests and more especially to a vibration testing installation in which a specimen such as a scale model of a building, for example, can be subjected simultaneously to controlled vibrations in two perpendicular directions (usually horizontal and vertical), the amplitudes and frequencies of the vibrations being varied at will in each direction independently of each other.

In accordance with conventional practice, these complex vibrations are usually transmitted to a specimen-holder table to which the specimen is secured and are imparted to said table with respect to a massive support structure. Preferably, said structure is in turn mounted on jacks and damping systems which ensure its independence with respect to the ground. However, there has not been found up to the present time any satisfactory solution for supporting the table and the specimen in such a manner as to ensure that the controlled vibrations are transmitted to the table in their entirety and without interference between the characteristics of the controlled vibrations in each of the perpendicular directions.

The precise aim of the present invention is to permit the achievement of independence between the two directions of vibrations while ensuring effective guidance of the table which is sufficient to permit the study of specimens having a large mass.

The vibration testing installation in accordance with the invention comprises means for subjecting a specimen-holder table to vibrations with respect to a massive support structure in two perpendicular directions, and guiding means which are independent of the vibration means, said guiding means being located between on the one hand the table and at least one connecting member and on the other hand said connecting member and the massive support structure, said connecting member being in mechanical relationship with the table and the massive structure solely by virtue of said guiding means.

The guiding means preferably comprise at least two guiding units each constituted by at least one shaft parallel to a first direction aforesaid and mounted in bearings which are rigidly fixed to the table, at least one shaft parallel to a second direction aforesaid and mounted in bearings which are rigidly fixed to the massive support structure, and at least one connecting member provided with bores at right angles to each other in which said shafts are slidably mounted. The shafts aforesaid as well as the connecting member are individual components and endowed with inherent rigidity.

Each guiding unit aforesaid advantageously comprises a connecting member having an intermediate portion parallel to the first direction and in sliding relation with three shafts and especially horizontal shafts which are parallel to the second direction, and two arms parallel to the second direction and in sliding relation with three shafts parallel to the first direction and especially vertical shafts.

In accordance with the invention, the vibration means can be constituted in particular by two jacks disposed respectively in each of the directions of vibrations, namely preferably a horizontal jack and a vertical jack, said two jacks being supplied from a hydraulic pressure generator by means of respective modulation circuits. Preferably, the horizontal jack produces action on one side of the specimenholder table and the vertical jack produces action at the center of the underface of said table. The guiding means can accordingly consist of two guiding units disposed between respectively two opposite frames of the massive support structure and each of two opposite sides of the table which are parallel to the horizontal jack.

Further distinctive features will become apparent from the following description from which a more complete understanding of the invention may be gained, reference being made to the accompanying drawings in which preferred embodiments are given by way of example without any limitation being implied, and in which:

FIG. 2 is a top view of the installation in accordance with FIG. 1;

FIG. 3 is a vertical part-sectional view of a preferred example of construction of a heavy seismic test installation in accordance with the invention;

Figure 1:
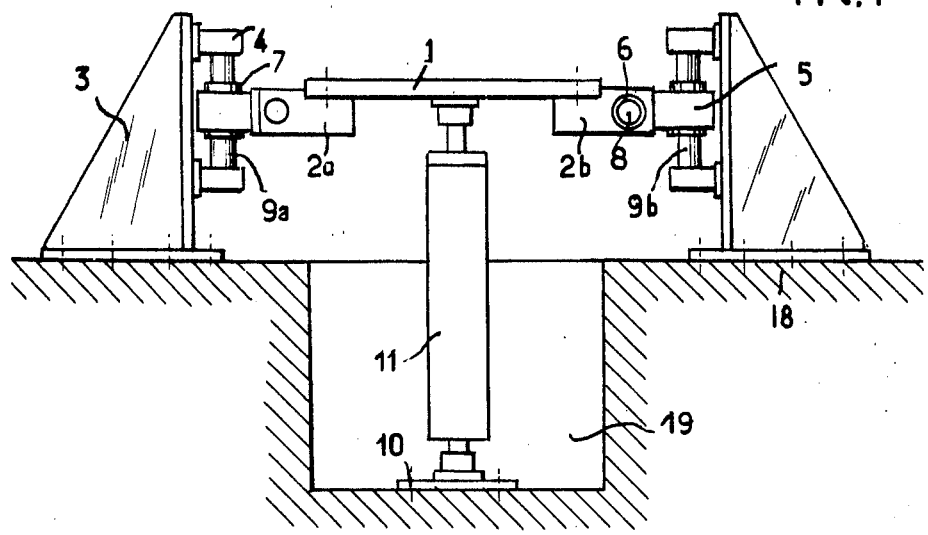
FIG. 1 is a view in elevation showing a simplified seismic test installation in accordance with the invention.

The installation shown in FIGS. 1 and 2 comprises a table 1 or specimen-holder on which a specimen (not shown) can be fixed in order to be subjected to vibration tests which simulate earthquakes. The vibrations are imparted along two perpendicular axes (said axes being respectively horizontal and vertical) with respect to a massive support structure 18 in which is formed a well 19. The vertical vibrations are imparted to the table 1 by a vertical jack 11 (shown in FIG. 1) which is pivotally mounted between the center of the underface of the table and the bottom of the well 19. The horizontal vibrations are imparted by a horizontal jack 16 pivotally mounted between one side of the table 1 and a right-angle support bracket 17 which is fixed on the top face of the massive support structure 18. The two jacks are mounted and articulated in a conventional manner by means of members such as those designated in FIG. 2 by the reference numerals 10, 12, 13, 14 and 15. Said jacks are connected to a hydraulic pressure generator by means of modulation circuits which are also of conventional design and have therefore not been shown in the drawings.

During its movements, the table 1 is guided with respect to the massive support structure by guiding means constituted in this embodiment by two guiding units placed between respectively two opposite frames of the massive support structure and each of two opposite sides of the table which are parallel to the horizontal jack. Said guiding units each comprise two connecting members between a horizontal shaft mounted in bearings which are rigidly fixed to the table and each comprise a vertical shaft mounted in bearings which are rigidly fixed to the massive support structure.

To sum up, the table 1 is therefore guided:

on the one hand vertically by four vertical shafts 9a, 9b, 9c, 9d (those designated by the references 9a and 9b are alone visible in FIG. 1 whilst only their axes are shown in FIG. 2). Said shafts are disposed in pairs on each side of the table and each supported by two bearings 4 secured to right-angle support brackets 3a (bearings of the shafts 9a and 9c) and 3b (bearings of the shafts 9b and 9d) which are in turn rigidly fixed to the massive support structure 18;

on the other hand horizontally by two horizontal shafts 8a and 8b each supported by three bearings 20 which are secured to the table 1. Each horizontal shaft mounted in the bearings 20 which are rigidly fixed to the table is slidably mounted within two connecting members such as those designated by the references 2a, 2b by means of sleeves 6. Each connecting member is in turn capable of sliding vertically along the particular vertical guide shaft which passes through said member within a sleeve 7.

The simplified installation shown in FIGS. 1 and 2 is primarily intended for the study of feasibility of the invention or for testing relatively light-weight specimens having small dimensions (table measuring 1 m×1 m).

Figure 4:
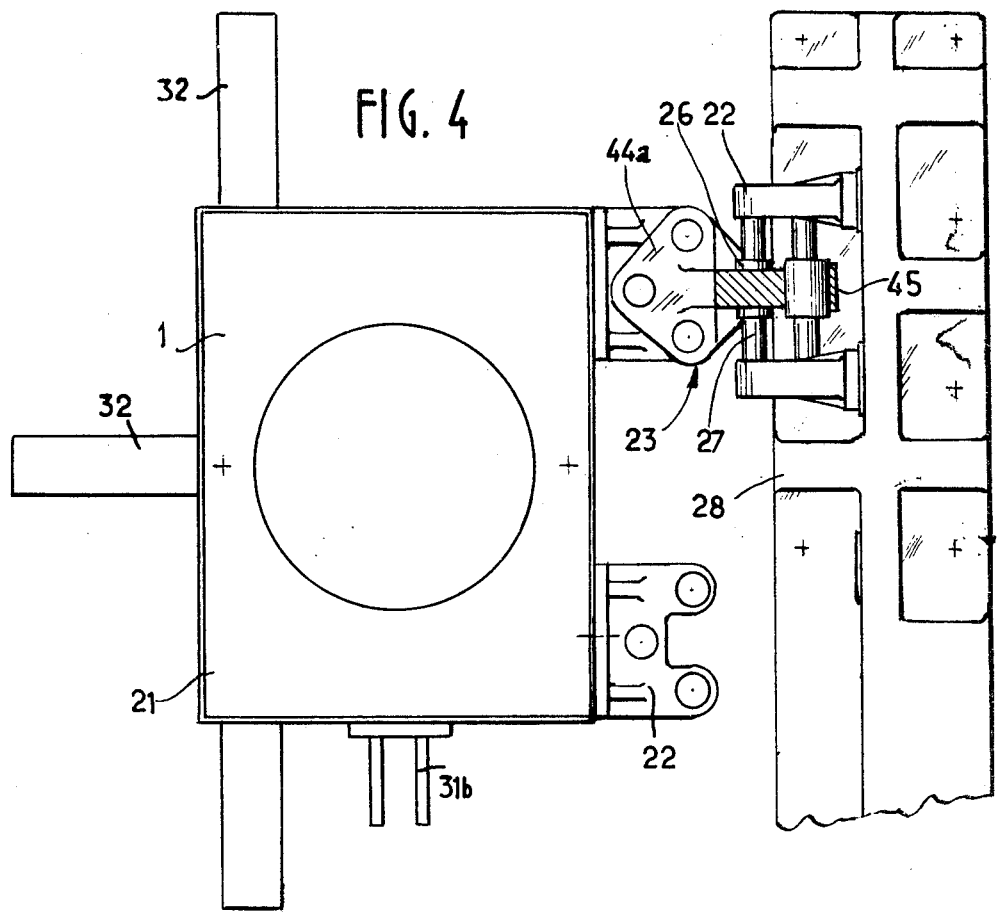
FIG. 4 is a part-sectional top view of the installation in accordance with FIG. 3.

The more elaborate installation shown in FIGS. 3 and 4 is based on the same guiding principle and makes use of a group of shafts rigidly fixed to the massive support structure, a group of shafts rigidly fixed to the table, and connecting members between horizontal shafts and vertical shafts for the displacement of said shafts in sliding motion. The constructional design of the vibration system is similar to that of the preceding installation in that it comprises a vertical jack and a horizontal jack. On the other hand, the four guiding units each comprise at least one vertical shaft mounted in bearings rigidly fixed to a central cylindrical body fixed underneath the table and at least one horizontal shaft mounted in bearings rigidly fixed to one of two opposite frames of the massive support structure, said frames being disposed on each side of the central cylindrical body. Moreover, each shaft is replaced by a group of three shafts.

FIGS. 3 and 4 do not illustrate the jacks themselves but only the members 31 (a, b, c) which are rigidly fixed to the table 1 or to the massive support structure 18 and in which said jacks are pivotally mounted.

The table 1 is rigidly fixed to a central cylindrical body 21 and secured to this latter by means of shoulder-brackets 32. Said table is guided vertically within each of the four units by three shafts 25 supported by three bearings 22 which are rigidly fixed to the central cylindrical body 21 (only two shafts of one of the guiding units are shown in FIG. 3 whilst the left-hand side is shown in the partly disassembled state). The three shafts of each guiding unit are slidably mounted within the sleeves 24 which are placed within bores formed for this purpose in two horizontal arms 44a, 44b of a connecting member 23. Said two arms are rigidly fixed to an intermediate vertical portion 45 in which the three horizontal guiding shafts 27 are slidably mounted by means of sleeves 26. Said shafts are each supported by two bearings 46 rigidly fixed to a right-angle support bracket 28 which is fixed on the massive support structure as shown on the left-hand side of FIG. 3 in which the shafts have not been illustrated. Whereas in the simplified system of FIGS. 1 and 2 the vertical guiding shafts were coupled to the massive support structure and the horizontal guiding shafts were coupled to the table, it is apparent from the example shown in FIGS. 3 and 4 that the vertical guiding shafts are coupled to the table and the horizontal shafts are coupled to the massive support structure.

In a particular installation constructed in accordance with FIGS. 3 and 4 as described in the foregoing and comprising a table measuring 3 m×3 m, specimens weighing up to 20 tons can be subjected to seismic tests at a frequency of up to 50 c/s with amplitudes of up to 220 mm.

As has already been brought out by the foregoing, it is clearly apparent that the invention is not limited in any sense to the particular forms of construction described herein by way of example but extends on the contrary to all alternative forms.

We claim:

1. A seismic test apparatus comprising: vibration means for subjecting a specimen holder table to vibrations with respect to a massive support structure in two perpendicular directions; at least two guiding units each defined by at least one first shaft parallel to the first of said directions, at least one second shaft parallel to a second of said directions, and connecting means provided with at least two bores at right angles to each other; said first shaft being mounted in bearings of the table and slidably mounted in at least a first bore of said connecting means, and said second shaft being mounted in bearings of the massive support structure and slidably mounted in at least a second of said bores of said connecting means being perpendicular to said first bore.

2. An apparatus according to claim 1, wherein said vibration means being formed of two jacks for connecting the specimen holder table to the massive support structure, one of said jacks being a horizontal jack acting on one side of the table and the other of said jacks being a vertical jack acting on the center of the underface of said table and wherein said two guiding units being located on opposite sides of the table which are parallel to the horizontal jack.

3. An apparatus according to claim 2 wherein: said connecting means has an intermediate portion parallel to the first direction and in sliding relation with second shafts parallel to the second direction and two arms parallel to the second direction and in sliding relation with first shafts parallel to the first direction.

* * * * *